(No Model.)
R. STILWELL.
SCREW.
No. 516,134. Patented Mar. 6, 1894.
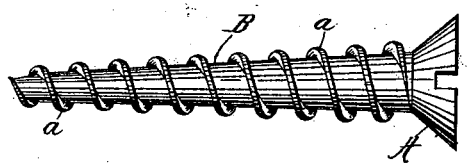
WITNESSES:
John Buckler,
Francis Rodriguez
INVENTOR
Rickason Stilwell
BY
James A. Whitney
ATTORNEY

UNITED STATES PATENT OFFICE.

RICKASON STILWELL, OF NEW YORK, N. Y., ASSIGNOR OF ONE-HALF TO JOSEPH R. STILWELL AND GATES WILLARD, OF SAME PLACE.

SCREW.

SPECIFICATION forming part of Letters Patent No. 516,134, dated March 6, 1894.

Application filed January 30, 1892. Serial No. 419,741. (No model.)

*To all whom it may concern:*

Be it known that I, RICKASON STILWELL, a citizen of the United States, residing at the city of New York, in the county and State of New York, have invented a new and useful Improvement in Screws, of which the following is a specification, reference being had to the accompanying drawing, which is a side view of a screw embracing my said invention.

The object of this invention is to provide a wood screw which with a continuous thread may be readily driven to its place in the wood, which will hold upon the wood with greater tenacity than the common screw by reason of a larger quantity of wood lodged between the coils of the thread when the screw is in use, and because of a greater length of holding or threaded shank, and with which the tendency to split the wood by the wedge like action of the non-threaded portion of the shank of the common screw is entirely obviated, and with which the easy countersinking of the head of the screw flush with the surface of the wood as the screw is driven home is secured. I secure these results with their corresponding practical advantages by making the spiral thread of the screw of a much more than ordinarily steep pitch and thus with a much more than ordinarily wide space between the coils of the thread and by extending the thread so pitched and spaced quite to the sloping surface of the conical under side of the head of the screw in such manner that the said under side of the head glides smoothly and without substantial break upon that portion of the wood part previously traversed by the adjacent portion of the thread when the screw is driven to its place.

As shown in the drawing the head of the screw has the usual flat and grooved outer surface, but when desired the head, so long as its under or inner surface has the sloping or conical contour substantially as shown in the figure, may be of any other appropriate configuration.

A is the head and B is the shank or body of the screw. The said head as just stated has its under side of the sloping or conical form. The shank, B, is of slightly tapering form. The thread, a, upon said body has a pitch equal to about five times the thickness, measured parallel with the shank, of the thread. This affords a steep inclination to the thread which permits the easy entrance of the screw into the wood when driven by a screw-driver or similarly urged by other driving implement, the thread being at the same time sufficient to hold upon the wood, and capable of a reverse axial movement when it is desired to withdraw the screw by means of a screw-driver. The said thread, instead of terminating at its upper end upon a non-threaded tapering part of the shank as with the thread of the common wood screw is extended quite up to, and is intended to act in conjunction with the sloping conical under side of the head A. By the means described a threefold object is attained, the tendency to split the wood from the wedge-like action of the non-threaded part of the shank incident to the use of the common wood screw is avoided, the thread, a, extending from the front to the head of the screw compensates by this increase of length for the shortening which would otherwise accrue from the steeper pitch of said thread, and a thicker and consequently stronger layer of wood fiber is interposed between the coils of the thread when the screw is driven home thereby giving the screw a very much stronger hold upon the wood. When the conical under side of the head comes upon the surface of the wood it is pressed snugly and with a turning movement which readily embeds or countersinks it flush with the surface, and the strain upon the wood-fiber between the coils of the threads which inheres in driving the common screw by reason of the resistance of the non-threaded part of the shank of the latter is wholly avoided in the use of my invention.

What I claim as my invention is—

As a new article of manufacture a wood-screw in which the thread, a, on the tapering shank, B, extends from the point of the latter to and in connection with the conical under side of the head, A, with a pitch of about five times, more or less, the thickness of the thread itself, substantially as and for the purpose herein set forth.

RICKASON STILWELL.

Witnesses:
GRAHAM MCADAM,
FRANCIS RODRIGUEZ.